Patented Mar. 1, 1949

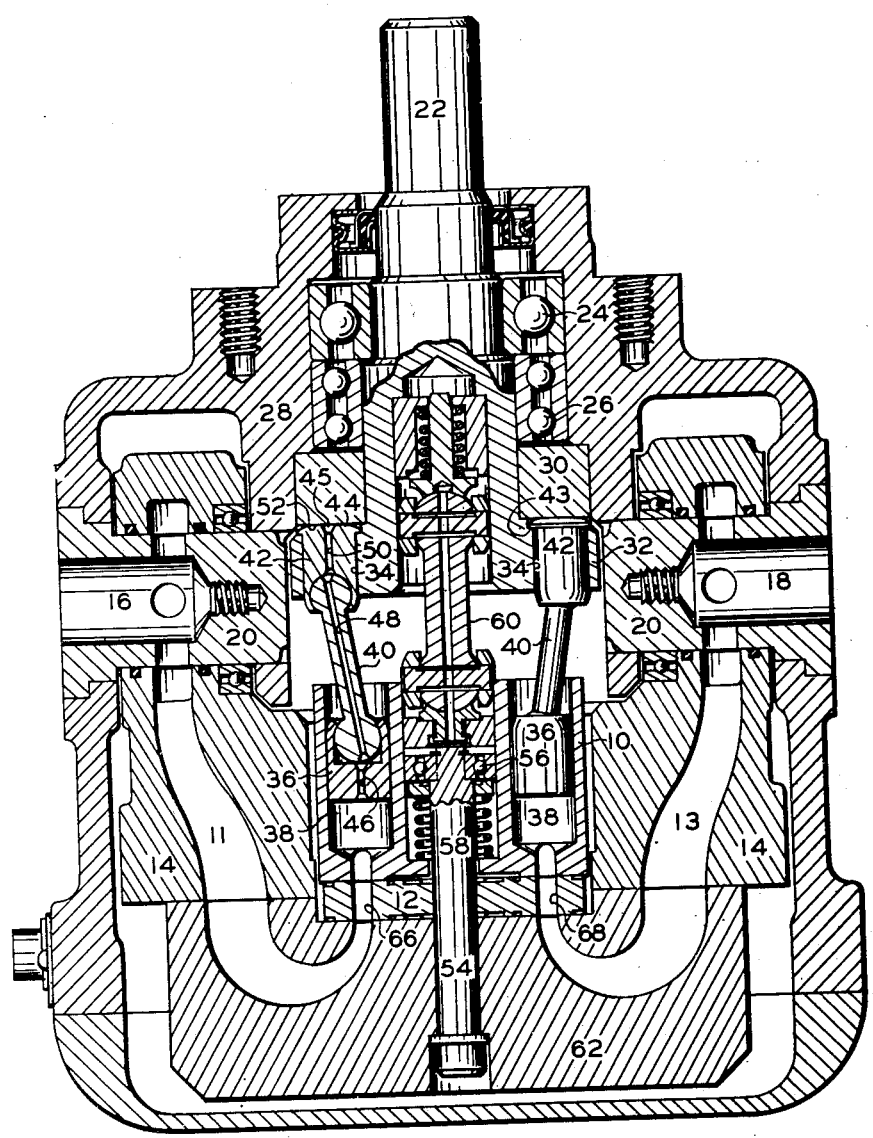

2,463,299

UNITED STATES PATENT OFFICE 2,463,299

POWER TRANSMISSION

Harley E. Nixon, Detroit, Mich., assignor to Vickers Incorporated, Detroit, Mich., a corporation of Michigan Application October 14, 1946, Serial No. 703,226

15 Claims. (Cl. 103—162)

This invention relates to power transmissions, particularly to those of the type comprising two or more fluid pressure energy translating devices, one of which may function as a pump and another as a fluid motor.

The present invention is particularly concerned with fluid pressure energy translating devices of the fixed or variable displacement type, and is particularly applicable to those of the class wherein the load forces generated by fluid pressure within the device are carried by the drive shaft and casing largely in an axial direction with respect to the shaft. In devices of this general character, the axial thrust loads are substantially in direct proportion to the fluid pressure at which the device operates. The present tendency in the art is toward increasingly higher pressures which naturally imposes greater and greater loads on the thrust bearing of the device.

It is an object of the present invention, therefore, to provide an improved pump or motor construction having a greatly increased thrust bearing capacity at all speeds and permitting operation at higher pressures and speeds than have heretofore been possible.

The hydraulic thrust bearings of the fluid film type are old in the art and have been employed mainly in two different forms. First, the slipper type, historically known as the Kingsbury bearing, functions on the principle of developing a fluid wedge between the moving and bearing surfaces, thereby providing a bearing support in the form of an anti-friction lubricating film. Such an application of the slipper type thrust bearing is described in the patent to Vickers 2,298,849. The second form introduces pressure fluid from an outside pressure source to a point between the bearing surfaces and thereby separates the surfaces by a fluid film which tends to flow toward and be discharged at the borders of the bearing.

The invention is particularly applicable to hydraulic pumps or motors employing a rotary cylinder barrel including multiple axial pistons reciprocably mounted therein and connected by piston rods to a drive shaft. When slipper or pressure fluid bearings are employed, they normally support the drive shaft in the pump frame or housing member. In the proposed design, the axial thrust load is not carried to the drive shaft, but is actually transmitted directly to the frame member.

Therefore, another object of the present invention is to provide a pump or motor design employing a thrust bearing adapted to transmit the axial load from the piston rod direct to the frame.

The art of thrust bearing construction and especially of the hydraulic pressure responsive type has required intricate mechanical structures and conduits. In the present invention, the coupling connecting the piston rod and drive shaft has been redesigned to function also as a thrust bearing and carry the axial load of the piston direct to the frame member.

Another object of the invention is to provide connecting rod couplings adapted to perform the function of thrust bearings.

Thrust bearings of the slipper type have the characteristics of functioning efficiently at high speed and relatively light load. During the starting operations, when the speeds are low and pressure is generally high, the slipper bearing offers higher resistance to rotation. This is due to the inherent principle of slipper bearings wherein they are required to reach normal operating speeds before they are capable of establishing the fluid bearing wedge between the plate and slipper. In the present invention, the slipper is designed to perform a dual function, namely that of a pressure bearing also. In other words, the cylinder pressure is communicated to the central portion of the slipper whereby the slipper will be separated from the bearing plate even at slow speed by means of the fluid pressure bearing.

Therefore, another object of the invention is to provide a combination slipper and pressure bearing capable of absorbing the axial thrust load efficiently at all speeds and varying pressures.

In order to lubricate the slipper bearing and at the same time have its reactive force vary in proportion to the operating pressure creating the axial load, intricate passages and controls were necessary in the past. In the present invention, wherein the piston rod socket operates as a pressure fluid bearing and slipper bearing, the most efficient and inexpensive method of establishing pressure communication between the socket bearing surface and pump cylinder is directly through the piston rod and linkage.

Another object of the present invention is to provide a direct inexpensive pressure communication between the slipper bearing and operating cylinder of the pump or motor.

It is also an object to provide a pump or motor of improved and more rugged compact and reliable construction employing an axial thrust bearing of the slipper type for conveying the axial load directly to the frame wherein the old structural parts are only slightly changed for serving the additional purposes.

Further objects and advantages of the present invention will be apparent from the following description, reference being had to the accompanying drawing wherein a preferred form of the present invention is clearly shown.

In the drawing the single figure illustrates a rotary axially reciprocating piston pump employing a preferred form of the invention.

Referring now to the drawing, a variable delivery pump or motor unit is shown comprising a cylinder barrel 10 bearing on a valve plate 12 and hydraulically connected by passages 11 and 13 through the yoke 14 to the dual inlet-outlet connections 16 and 18 of pintles 20. A drive shaft 22 supported by the bearings 24 and 26 in the frame 28 is provided with a flange 32 having axial guide holes 34 adjacent the annular frame element 30.

Pistons 36 are mounted in the cylinders 38 and linked to the flange 32 by double-end ball joint piston rods 40. The ball joint sockets 42 are reciprocably mounted in guide holes 34 and retained therein by flange 43. The head of the socket is designed to form a slipper bearing 44 in combination with a pressure pocket 45 and is adapted to bear axially on frame 28 through annular frame element 30. Pressure fluid from the cylinder 38 is conducted to the pressure pocket 45 to form a fluid pressure bearing and at the same time lubricate the slipper bearing 44 by means of passage 46 in piston 36, passage 48 in rod 40, and passage 50 of ball socket 42 to the bearing surface 52 of annular frame element 30.

The cylinder barrel is rotatably supported by pin 54 and bearing 56 and maintained in contact with valve plate 12 by the combination of cylinder pressure and the spring 58. A cardan link 60 couples the shaft 22 and cylinder barrel 10 in driving relation. The supporting plate 62 of the valve plate 12 is pivoted to the frame by the yoke 14 and pintles 20.

In operation, the suction fluid may be drawn in at either connection 16 or 18 according to the direction of rotation and is conducted through passages 11 or 13 of the yoke to the valve ports 66 and 68 and into the cylinders 38. As the fluid pressure rises in the cylinder 38, it is communicated through passages 46, 48, and 50 to the bearing pressure pocket 45 and surface 52.

As the cylinder pressure increases, the axial thrusts will increase in proportion thereto, but at the same time, the fluid pressure through passages 46, 48, and 50 to the pressure pockets 45 also increases in the same proportion. By correctly proportioning the areas of piston 36 and pressure pockets 45, the pressure force in the pockets tending to separate the slipper 44 from the frame member 30 can be made slightly greater than the resultant axial thrust thus permitting fluid flow outwardly across the face of the slipper 44 and surface 52 to maintain a fluid bearing film therebetween.

As the speed increases and the pressure communication is retarded, the slipper bearing 44 will begin to function in co-operation with the fluid pressure bearing or independently thereof. Therefore, the axial thrust of socket 42 is directly communicated through the fluid pressure and slipper bearings to the annular frame element 30.

It will thus be seen that the present invention has provided an axial thrust bearing for a pump or motor of the class described which is pressure responsive to the variable axial loads created. This is accomplished by a novel combination slipper and pressure responsive bearing formed on the connecting rod coupling and pressure actuated through a passage communicating directly through the connecting rods to the cylinders served by the respective bearings.

While the form of embodiment of the invention as herein disclosed constitutes a preferred form, it is to be understood that other forms might be adopted, all coming within the scope of the claims which follow.

What is claimed is as follows:

1. In a pump or motor device the combination of a stationary frame member, a pumping mechanism including a cylinder barrel provided with multiple, axially disposed cylinders and pistons reciprocably mounted therein, a rotary driving member supported by the frame member, and a driving linkage connecting the pistons to the rotary driving member whereby the tangential forces of rotation are transmitted to the driving member, and bearing means associated with the driving linkage for transmitting the axial forces directly to the frame member.

2. In a pump or motor device the combination of a stationary frame member, a pumping mechanism including a cylinder barrel provided with multiple, axially disposed cylinders and pistons reciprocably mounted therein, a rotary driving member supported by the frame member, and a driving linkage connecting the pistons to the rotary driving member including axially disposed guide holes in the rotary driving member bottoming against the frame member, piston rods, and socket elements being rotatively and reciprocably mounted in the guide holes and connected to the piston rods for transmitting the forces of rotation to the driving member and adapted to bear axially against the frame member for transmitting the axial forces directly to the frame member.

3. In a pump or motor device the combination of a stationary frame member, a pumping mechanism including a cylinder barrel provided with multiple, axially disposed cylinders and pistons reciprocably mounted therein, a rotary driving member supported by the frame member, and a driving linkage connecting the pistons to the rotary driving member including axially disposed guide holes in the rotary driving member bottoming against the frame member, piston rods, and socket elements being rotatively and reciprocably mounted in the guide holes and connected to the piston rods for transmitting the forces of rotation to the driving member and a slipper bearing structure associated with the socket element and adapted to bear axially against the frame member for transmitting the axial forces directly to the frame member.

4. In a pump or motor device the combination of a stationary frame member, a pumping mechanism including a cylinder barrel provided with multiple, axially disposed cylinders and pistons reciprocably mounted therein, a rotary driving member supported by the frame member, and a driving linkage connecting the pistons to the rotary driving member including axially disposed guide holes in the rotary driving member bottoming against the frame member, piston rods, and socket elements being rotatively and reciprocably mounted in the guide holes and connected to the piston rods for transmitting the forces of rotation to the driving member and adapted to bear axially against the frame member for transmitting the axial forces directly to the frame member, and means including a passage through the socket and piston rod for varying the lubricating pressure on the slipper bearing in proportion to the degree of cylinder pressure creating the axial load.

5. A radial and thrust bearing construction for a hydraulic pump or motor device employing a stationary frame member, a pumping mechanism, a rotary driving member supported by the frame member, and a linkage connecting the pumping mechanism with the driving member, said bearing construction including axial guide holes in the rotary driving member communicating with the frame member, sockets provided at one end with slipper bearings and at the other end connected to the linkage, the sockets being rotatively and reciprocably mounted in the guide holes whereby tangential forces from the pumping mechanism are transmitted to the rotary driving member and axial forces are transmitted by the sockets directly to the slipper bearing and frame member.

6. A radial and thrust bearing construction for a hydraulic pump or motor device employing a stationary frame member, a pumping mechanism, a rotary driving member supported by the frame member, and a linkage connecting the pumping mechanism with the driving member, said bearing construction including axial guide holes in the rotary driving member communicating with the frame member, sockets provided at one end with slipper bearings and at the other end connected to the linkage, the sockets being rotatively and reciprocably mounted in the guide holes whereby tangential forces from the pumping mechanism are transmitted to the rotary driving member and axial forces are transmitted by the sockets directly to the slipper bearing and frame member, and means including a passage through the socket and piston rod for varying the hydraulic pressure on the slipper bearing in proportion to the axial force on the rod.

7. In a pump or motor device the combination of a stationary frame member, a rotary driving member, and a pump mechanism including a rotary cylinder barrel employing axially disposed cylinders and pistons reciprocably mounted therein, couplings rotatively supported and reciprocably mounted in the driving member and adapted to bear axially against the frame member, and piston rods connecting the pistons and couplings.

8. In a pump or motor device the combination of a stationary frame member, a rotary driving member, and a pump mechanism including a rotary cylinder barrel employing axially disposed cylinders and pistons reciprocably mounted therein, couplings in the form of slipper bearings rotatively supported and reciprocably mounted in the driving member and adapted to bear axially against the frame member, and piston rods connecting the pistons and couplings.

9. In a pump or motor device the combination of a stationary frame member, a rotary driving member, and a pump mechanism including a rotary cylinder barrel employing axially disposed cylinders and pistons reciprocably mounted therein, couplings in the form of slipper bearings, rotatively supported and reciprocably mounted in the driving member and adapted to bear axially against the frame member, and piston rods connecting the pistons and couplings, and pressure passages extending from the cylinders through the rods and couplings to the bearing surface of the slipper bearings.

10. In a pump or motor device the combination of a stationary frame member, a rotary driving member, and a pump mechanism including a rotary cylinder barrel employing axially disposed cylinders and pistons reciprocably mounted therein, double end ball joint piston rods fastened at one end to the pistons, and ball socket couplings rotatively supported and reciprocably mounted in the driving member and designed to function as slipper bearings and carry the axial thrust of the rods direct to the frame.

11. In a pump or motor device the combination of a stationary frame member, a pump mechanism including a rotary cylinder barrel employing axially disposed cylinders and pistons reciprocably mounted therein, piston rods connected at one end to the pistons, ball socket couplings fastened to the rods at the other end, a rotary driving member comprising a shaft provided with a flanged portion, axial circular guides in said flange for rotatively supporting the couplings and transmitting tangential forces to the driving member, said couplings being reciprocably mounted in the guides and adapted to bear axially against the stationary frame member for transmitting the axial thrust loads through the couplings direct to the frame member.

12. In a pump or motor device the combination of a stationary frame member, a pump mechanism including a rotary cylinder barrel employing axially disposed cylinders and pistons reciprocably mounted therein, piston rods connected at one end to the pistons, ball socket couplings fastened to the rods at the other end, a rotary driving member comprising a shaft provided with a flanged portion, axial circular guides in said flange for rotatively supporting the couplings and transmitting tangential forces to the driving member, said couplings being reciprocably mounted in the guides and adapted to bear axially against the stationary frame member for transmitting the axial thrust loads through the couplings direct to the frame member, and a slipper bearing on the end of the ball socket coupling adapted to bear directly on the stationary frame member.

13. In a pump or motor device the combination of a stationary frame member, a pump mechanism including a rotary cylinder barrel employing axially disposed cylinders and pistons reciprocably mounted therein, piston rods connected at one end to the pistons, ball socket couplings fastened to the rods at the other end, a rotary driving member comprising a shaft provided with a flanged portion, axial circular guides in said flange for rotatively supporting the couplings and transmitting tangential forces to the driving member, said couplings being reciprocably mounted in the guides and adapted to bear axially against the stationary frame member for transmitting the axial thrust loads through the couplings direct to the frame member, and a pressure fluid passage extending through each piston, rod, and ball socket to the bearing surface of each coupling for establishing a pressure fluid bearing film between the coupling and frame member in proportion to variations in the cylinder pressure and axial thrust load of the piston.

14. In a pump or motor device the combination of a stationary frame member, a pump mechanism including a rotary cylinder barrel employing axially disposed cylinders and pistons reciprocably mounted therein, piston rods connected at one end to the pistons, ball socket couplings fastened to the rods at the other end, a rotary driving member comprising a shaft provided with a flanged portion, axial circular guides in said flange for rotatively supporting the couplings and transmitting tangential forces to the driving member, said couplings being reciprocably mounted in the guides and adapted to bear axially against the stationary frame member for transmitting the axial thrust loads through the couplings direct to the frame member, a slipper bearing on the end of each ball socket coupling adapted to bear directly on the stationary frame member, and a pressure fluid passage extending through each piston, rod, and ball socket to the bearing surface of each coupling for establishing a pressure fluid bearing film between the coupling and frame member in proportion to variations in the cylinder pressure and axial thrust load of the piston.

15. In a pump or motor device the combination of a stationary frame member, a pump mechanism including a rotary cylinder barrel employing axially disposed cylinders and pistons reciprocably mounted therein, piston rods connected at one end to the pistons, ball socket couplings fastened to the rods at the other end, a rotary driving member comprising a shaft provided with a flanged portion, axial circular guides in said flange for rotatively supporting the couplings and transmitting tangential forces to the driving member, said couplings being reciprocably mounted in the guides and adapted to bear axially against the stationary frame member for transmitting the axial thrust loads through the couplings direct to the frame member, a combination slipper and fluid pressure bearing supplied by pressure fluid from the cylinders by means of intercommunicating passages in each piston, piston rod, and ball socket.

HARLEY E. NIXON.

No references cited.